June 11, 1968 G. EGGSTEIN 3,387,455
APPARATUS FOR PRESSURIZING FLUIDS
Filed July 13, 1966 3 Sheets-Sheet 1

INVENTOR
Giorgio Eggstein
BY
Michael J. Striker
ATTORNEY

June 11, 1968  G. EGGSTEIN  3,387,455
APPARATUS FOR PRESSURIZING FLUIDS
Filed July 13, 1966  3 Sheets-Sheet 2

INVENTOR
Giorgio Eggstein
BY
Michael J. Striker
ATTORNEY

June 11, 1968  G. EGGSTEIN  3,387,455
APPARATUS FOR PRESSURIZING FLUIDS
Filed July 13, 1966  3 Sheets-Sheet 3

INVENTOR
Giorgio Eggstein
BY
Michael S. Striker
ATTORNEY

United States Patent Office 3,387,455
Patented June 11, 1968

3,387,455
APPARATUS FOR PRESSURIZING FLUIDS
Giorgio Eggstein, Turin, Italy, assignor to Ernst Heinkel Aktiengesellschaft, Stuttgart-Zuffenhausen, Germany
Filed July 13, 1966, Ser. No. 564,785
Claims priority, application Germany, July 23, 1965, H 56,667
4 Claims. (Cl. 60—54.6)

ABSTRACT OF THE DISCLOSURE

An apparatus for pressurizing fluids, for instance hydraulic fluids in a brake cylinder, in which the action of a first piston on the fluid in a first cylinder is supported by the action of a second piston on the first piston, and in which the second piston includes a flexible diaphragm dividing a second cylinder in two chambers, with one of which suction generating means communicate, and in which valve means formed in part by the flexible diaphragm cooperate with the other components of the apparatus in such a manner that, during movement of a first piston from a retracted position, the valve means is first moved to a position in which the chambers are sealed from each other, and then to a position in which the other chamber is connected to the atmosphere, so that the second piston moves in the same direction as the first piston unedr the influence of the pressure difference in the two chambers and thus supports the action of the first piston to compress the fluid in the first cylinder.

---

The present invention relates to an apparatus for pressurizing fluids. More particularly, the invention relates to improvements in apparatus which may be utilized for pressurizing an entrapped body of fluid, especially hydraulic fluid. Such apparatus may be utilized in automotive vehicles to pressurize fluid in the brake cylinders, to pressurize fluid in a power steering system, and/or to facilitate the operation of a clutch.

It is already known to provide the braking system of an automotive vehicle with a pneumatic servomotor which can assist the driver in the application of braking force. Such servomotor normally comprises one or more pistons which are received in one or more cylinders and divide the interior of such cylinders into two chambers one of which is connected with the suction manifold and the other of which can be connected to the atmosphere when the brake pedal is depressed. The differential in pressures between the two chambers causes the piston or pistons to change their positions and to thereby subject the entrapped body of fluid to pressure which produces a desired braking action.

Servomotor-operated braking, power steering and clutch systems are now demanded by purchasers of automotive vehicles and by authorities, not only in relatively large luxurious automobiles but also on cars in the medium-price and low-price range.

A serious drawback of presently known pneumatic servomotors for use in the braking, steering and clutch systems of automotive vehicles is that they employ a very complicated arrangement of valves which control the flow of air into and between the chambers of the cylinder. As a rule, designers of such servomotors attempt to construct the valves in such a way that the transition between the braking action which is produced by muscle power alone and the braking action which is brought about by the servomotor is very smooth. In many instances, the valves include elements made of rubber or similar elastomeric material to delay the braking action which is induced by the servomotor. This is due to the fact that a clearly defined transition phase between the braking action by muscle power and the braking action of the servomotor is considered unavoidable and, in order to render the transition less abrupt, the braking action induced by the servomotor is normally delayed.

My invention is based in part on the recognition that the aforementioned clearly defined transition stage between the application of braking or pressurizing force by muscle power alone and the application of such force by the servomotor is due to unsatisfactory construction of valves which control the operation of the servomotor. Such valves invariably utilize helical springs whose inertia plays a very important role because it causes a delay in the application of the servomotor-induced pressurizing force. Additional delays are caused by movements which the parts of the valves must perform in order to compensate for clearances between such parts.

Accordingly, it is an important object of the present invention to provide a novel and improved pressurizing apparatus which can be utilized with particular advantage in the braking, steering and/or clutch systems of automotive vehicles and which is constructed and assembled in such a way that the transition between the application of pressurizing force by muscle power alone and the application of pressurizing force in response to operation of the servomotor is gradual, that such transition takes place without any delay, and that the operator of the apparatus is invariably in a position to sense or to be otherwise aware of changes in the total pressurizing force.

Another object of the invention is to provide an apparatus of the just outlined characteristics wherein the valve system of the servomotor can respond without any delay and whose construction is so simple, compact and reliable that it can be readily incorporated in automotive vehicles in the medium and low price range.

A further object of the invention is to provide a novel servomotor for use in such pressurizing apparatus.

An additional object of the invention is to provide a novel valve system for the servomotor.

A concomitant object of the invention is to provide a pressurizing apparatus which is particularly suited for use in the brake system of an automotive vehicle.

Briefly stated, one feature of my invention resides in the provision of an apparatus for pressurizing an entrapped body of fluid, particularly for pressurizing a hydraulic fluid in the brake cylinders, in the power steering system or in the clutch system of an automotive vehicle. The apparatus comprises a first or master cylinder containing a supply of fluid, a first or master piston which is reciprocable in the cylinder to pressurize the fluid while moving from a retracted position, a pneumatic servomotor including a second cylinder which may be carried by the first cylinder, a second piston dividing the interior of the second cylinder into a pair of chambers and comprising means for moving the first piston from retracted position in response to its own movement from a starting position to thus reduce the volume of one of the two chambers in the second cylinder, suction generating means (preferably constituted by the suction manifold of an internal combustion engine) connected with the one chamber in the second cylinder, and valve means for connecting the chambers to each other with concomitant sealing of the other chamber from the atmosphere when the first piston is held in retracted position, and motion transmitting means (which may include the brake pedal of an automotive vehicle) for moving the first piston from retracted position and for thus sealing the two chambers from each other together with connecting the other chamber to the atmosphere so that the resulting differential between the pressures in the two chambers effects movement of the second piston from starting position and attendant additional movement of the first piston from retracted position.

The novel features which are considered as characteristic of the invention are set forth in particular in the appended claims. The improved pressurizing apparatus itself, however, both as to its construction and its mode of operation, together with additional features and advantages thereof, will be best understood upon perusal of the following detailed description of a specific embodiment with reference to the accompanying drawings, in which:

Figures 1, 2:
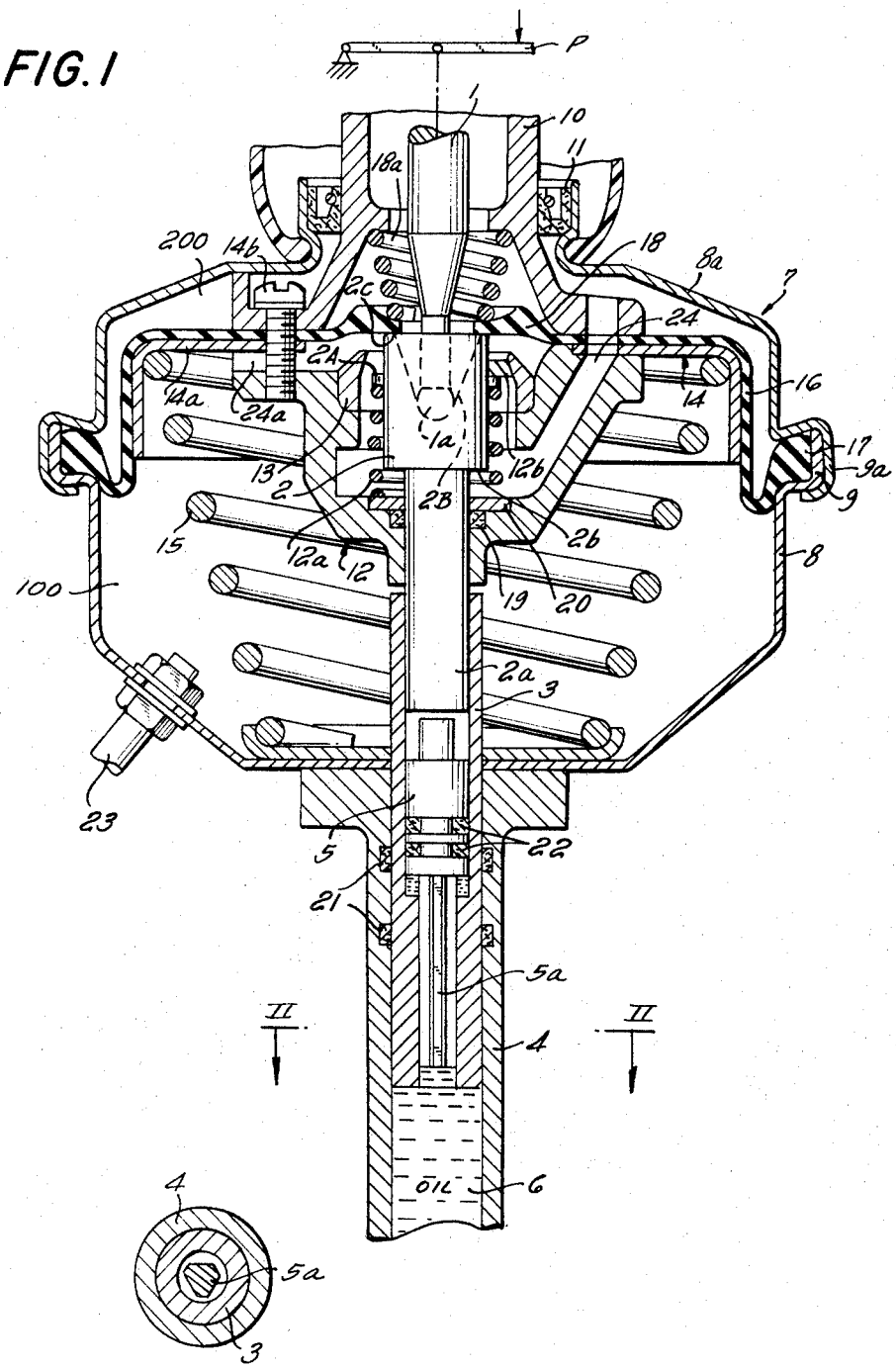
FIG. 1 is an axial section through a pressurizing apparatus which embodies my invention, the two pistons being shown in their respective retracted and starting positions.
FIG. 2 is a transverse horizontal section as seen in the direction of arrows from the line II—II of FIG. 1.

Referring first to FIG. 1, there is shown an apparatus which can be utilized for applying braking pressure in an automotive vehicle and is provided with a pneumatic servomotor which can assist the driver in applying such braking pressure with no transition between the application of braking pressure solely by the force exerted by the driver and the force furnished by the servomotor. The apparatus comprises a motion transmitting device including a pusher 1 whose upper end is coupled to a customary brake pedal P and whose lower end carries a spherical head 1a forming part of a coupling which connects the pusher with a reciprocable plunger 2 forming the second inner piston element of a first composite piston (hereinafter called master piston). The aforementioned coupling further includes a helical expansion spring 12a which bears against a set of radially outwardly extending projections or retainers 2A provided on the periphery of the piston element 2 and abutting against a stop 12b when the master piston assumes the retracted position of FIG. 1. The spherical head 1a is accommodated in the deepmost zone of a conical recess 2B provided in the adjoining end face of the piston element 2. The piston element 2 comprises a smaller-diameter extension 2a which is reciprocable in the adjoining open end of a tubular outer piston element 3 also forming part of the master piston. The upper end of the extension 2a is surrounded by an annular shoulder 2b located in a plane which is normal to the axis of the master piston. The lower portion of the outer piston element 3 (as viewed in FIG. 1) extends into the axial bore of a first cylinder 4 (hereinafter called master cylinder) which accommodates a supply of fluid 6, e.g., oil. When the piston element 3 leaves its retracted position and moves downwardly, as viewed in FIG. 1, its lower end face will exert a pressure upon the supply of fluid 6 so that the fluid is pressurized at a rate which is proportional with the extent of movement of such piston element from its retracted position.

The master piston further comprises a first inner piston element 5 which is accommodated in the axial bore of the outer piston element 3 and can be shifted by the extension 2a of the piston element 2 when the latter leaves its retracted position. This piston element 5 comprises a downwardly projecting end portion or extension 5a which dips into the supply of fluid 6. It will be seen that the extension 5a is received in the outer piston element 3 with such clearance that its external surface and the internal surface of the piston element 3 define between themselves one or more axially parallel channels into which the fluid 6 can penetrate when the master piston (including the elements 2, 3 and 5) is moved from its retracted position. FIG. 2 shows that the outline of the extension 5a may resemble a triangle so that this extension and the outer piston element 3 define three elongated channels for the entry of fluid.

The apparatus of my invention further comprises the aforementioned pneumatic servomotor which includes a second cylinder 7 having a cupped lower part or base 8 and a cupped upper part or cover 8a. The open ends of the parts 8, 8a are respectively provided with suitably configured flanges 9, 9a whereby the flange 9a surrounds the flange 9 to provide a fluidtight seal and to prevent uncontrolled entry of atmospheric air into the interior of the second cylinder 7. The smaller-diameter end of the cover 8a accommodates an annular gasket 11 which surrounds a cylindrical guide member 10 forming part of a second piston 14. This second piston 14 divides the interior of the cylinder 7 into a lower compartment or chamber 100 which accommodates a helical return spring 15 and an upper chamber or compartment 200 which is surrounded by the cover 8a. In addition to the aforementioned guide member 10, the piston 14 further comprises a rigid cup-shaped stiffener 14a which may consist of sheet metal and is accommodated in the median portion of a flexible diaphragm 16 consisting of rubber or the like, the latter having a relatively thick annular marginal bead 17 which is sealing clamped between the flanges 9 and 9a to insure that the two chambers 100, 200 of the cylinder 7 are properly sealed from each other along the junction between the base 8 and the cover 8a. The stiffener 14a is provided with a relatively large centrally located opening or cutout which is partially sealed by the innermost annular portion 18 of the diaphragm 16. Bolts 14b (only one shown) connect the stiffener 14a with the diaphragm 16, with the guide member 10, and with a second guide member 12 which is accommodated in the lower chamber 100 of the cylinder 7 and also forms part of the piston 14. One of the functions of the guide member 12 is to move the outer piston element 3 of the master piston further away from the retracted position when the piston 14 is displaced in the cylinder 7 in a sense to reduce the volume of the lower chamber 100. The lower end of the base 8 of the cylinder 7 is sealingly secured to an annular boss at the upper end of the master cylinder 4.

The servomotor further comprises a suction generating device which includes a pipe 23 connected with the lower chamber 100 of the cylinder 7 and with the suction manifold of an internal combustion engine. Thus, the pressure in this lower chamber 100 is less than atmospheric pressure, and the two chambers 100, 200 are free to communicate with each other through one or more connecting channels 24 when the master piston including the piston elements 2, 3, 5 is held in the retracted position of FIG. 1.

The guide member 12 supports an annular valve seat 13 which forms part of a composite valve for the servomotor. The seat 13 surrounds with clearance the piston element 2 and is provided with the aforementioned stop or stops 12b for the retainers 2A of the piston element 2. The innermost portion 18 of the diaphragm 16 is biased against the top portion 2c of the piston element 2 by a resilient element here shown as a helical expansion spring 18a whose uppermost convolution bears against an internal collar of the guide member 10. The hub 12A of the guide member 12 accommodates an annular sealing gasket 19 which surrounds the extension 2a of the piston element 2, and an annular washer 20 which can be approached by the larger-diameter stage of the piston element 2 when the latter is compelled to leave its retracted position and moves with reference to the piston 14. Suitable sealing rings 21 and 22 are inserted into circumferential grooves of the piston elements 3 and 5 to prevent leakage of fluid 6 upwardly and into the chamber 100 and into the space between the piston elements 2 and 5.

FIG. 1 illustrates the apparatus in idle position. The master piston is retracted and the piston 14 is held in a starting position. The space above the innermost portion 18 of the diaphragm 16 and the recess 2B communicate with the atmosphere through the guide member 10. The upper chamber 200 is sealed from the atmosphere by the valve member which is constituted by the annular top portion 2c of the piston element 2, and by the elastic seat which is constituted by the innermost annular part of the annular portion 18. This valve seat is integral with an annular valve member or bead which also forms part of the innermost portion 18 and can be moved into sealing engagement with the seat 13 when the piston element 2 is caused to leave its retracted position. Thus, the innermost portion 18 of the diaphragm 16 actually forms an annular valve seat for the valve member constituted by the top portion 2c of the piston element 2, and the portion 18 also forms a valve member which can cooperate with the seat 13 to seal the chambers 100 and 200 from each other. The parts which are constituted by the innermost portion 18 form an integral unit which consists of elastic material.

In the position of FIG. 1, the larger-diameter stage (valve member 2c) of the piston element 2 prevents the spring 18a from moving the innermost portion 18 of the diaphragm 16 into sealing engagement with the seat 13. Therefore, the chambers 100 and 200 are free to communicate with each other through the aforementioned channel or channels 24, through the annular gap between the piston element 2 on the one hand and the guide member 12 and seat 13 on the other hand, and through a further channel 24a between the stiffener 14a and the guide member 12. In other words, the pressure in the chambers 100 and 200 is the same. The difference between the atmospheric pressure and the pressure in the chambers 100, 200 depends on the compression ratio of the internal combustion engine and may be between 0.6–0.7 atmosphere. The spring 15 maintains the piston 14 in starting position because the pressure in the chambers 100 and 200 is the same.

Figure 3:
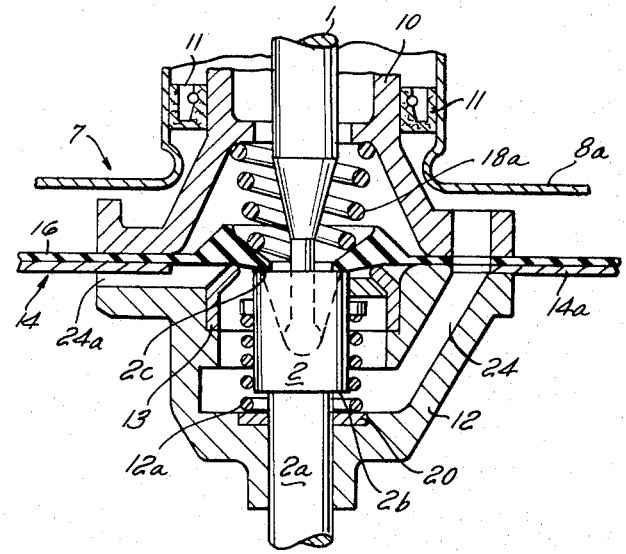
FIG. 3 is a fragmentary axial section through the appratus and illustrates the first piston in an intermediate position when the fluid is pressurized solely in response to pressure exerted by muscle power.

FIG. 3 illustrates the apparatus in a position when the operator has applied pressure against the brake pedal P to move the piston element 2 from its retracted position. The piston element 2 then moves with reference to the piston element 3 so that its extension 2a penetrates deeper into the bore of the piston element 3. As long as the counterpressure exerted by the hydraulic fluid 6 and by the spring 15 is less than the bias of the spring 12a, the second piston 14 shares the movement of the piston element 2 and reduces the volume of the chamber 100. The upper side of the innermost portion 18 of the diaphragm 16 is subjected to atmospheric pressure so that it undergoes deformation and continues to remain in sealing engagement with the valve member 2c. Also, the aforementioned valve member or bead of the innermost portion 18 moves into sealing engagement with the seat 13 to thereby seal the upper chamber 200 from the lower chamber 100. In other words, in the position of the piston element 2 shown in FIG. 3, the chamber 200 is sealed from the chamber 100 and from the atmosphere because the valve of the servomotor is now effective in two ways, namely, to seal the chambers 100, 200 from each other (valve seat 13 and the innermost portion 18) and to seal the upper chamber 200 from the atmosphere (valve member 2c and the innermost portion 18).

Figure 4:
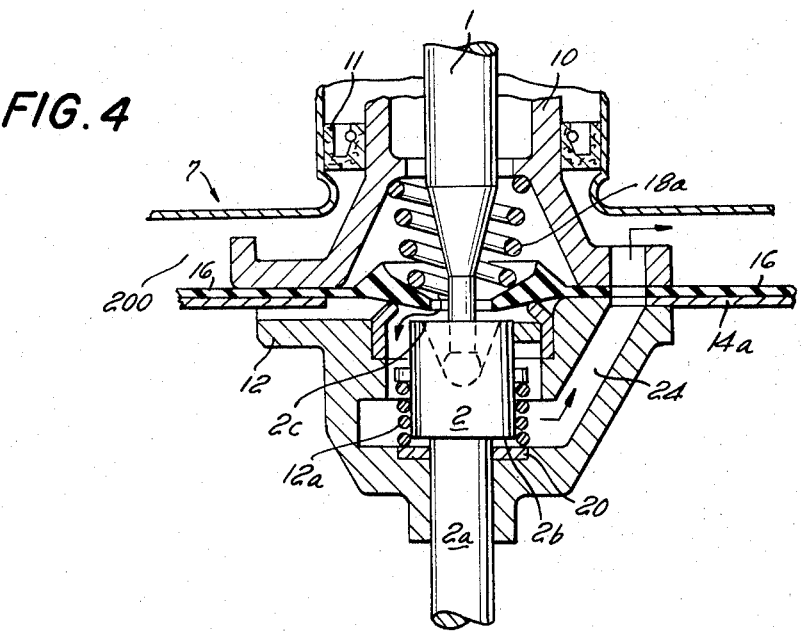
FIG. 4 is a similar fragmentary section but showing the apparatus in a position when the servomotor is effective to contribute to the pressurizing action.

If the driver continues to depress the brake pedal P to produce an impulse which exceeds a predetermined primary impulse, the pusher 1 shifts the piston element 2 to the position which is illustrated in FIG. 4. The shoulder 2b of the piston element 2 approaches the washer 20. The innermost portion 18 of the diaphragm 16 bears against the valve seat 13 to seal the chambers 100 and 200 from each other, but the valve member 2c moves away from the innermost portion 18 so that atmospheric air can penetrate into the upper chamber 200 and the resulting differential between the pressures in the chambers 100 and 200 causes the piston 14 to reduce the volume of the chamber 100 so that the hub 12A forces the outer piston element 3 into the master cylinder 4 with attendant pressurization of the fluid 6. Atmospheric air is admitted into the chamber 200 through the gap between the valve member 2c and the innermost portion 18, through the gap between the piston element 2 and the valve seat 13, and through the channel or channels 24. The channel 24a is sealed from the channel or channels 24 by the diaphragm 16 and valve seat 13.

If the driver ceases to depress the pedal P when the valve seat 13 has moved away from the innermost portion 18 of the diaphragm 16, the outer piston element 3 will continue to penetrate into the master cylinder 4 until the pressure in the chamber 200 rises to atmospheric pressure. The distance between the hub 12A and the shoulder 2b then increases and may reach the distance which is shown in FIG. 3 or even the distance shown in FIG. 1. During such displacement of the piston 14 in response to rising pressure in the upper chamber 200, the parts 1, 2 and 5 can remain stationary, i.e., a relative movement takes place between the parts 1, 2, 5 on the one hand and the parts 12, 13, 14a, 16 on the other hand. If the driver thereupon removes his foot from the pedal P, the springs 12a and 15 automatically return the piston elements 2, 3, 5 and the piston 14 to their respective retracted and starting positions shown in FIG. 1.

A very important function of the first inner piston element 5 is to enable the driver to sense the counterpressure of fluid 6 in the master cylinder 4 and to sense such counterpressure continuously so that he is always in a position to judge the magnitude of the braking force. The piston element 5 exerts a pressure directly against the piston element 2, i.e., independently of the outer piston element 3, to thus assist the spring 12a in returning the piston element 2 to its retracted position. The driver will feel the counterpressure in response to minimal depression of the pedal P or in response to maximal depression of the pedal, and the counterpressure rises gradually regardless of whether the braking force is so small that it is carried out solely in response to the force transmitted to the pedal P (position shown in FIG. 3) or by a combination of such force with the force produced by the servomotor.

The feature that the components of the valve including the parts 13, 2c and 18 are coaxial with each other and must cover very little distances to move from the one to the other position is of considerable importance in the apparatus of my invention because the apparatus will react with a minimal delay. It was found that the interval required for moving the master piston 2, 3, 5 from the retracted position to the position corresponding to the application of a medium braking pressure of about 70 atmospheres takes up between 60 and 70 milliseconds. The interval required for the application of full braking pressure of about 130 atmospheres takes up about 100 milliseconds. In conventional braking apparatus, the interval required for the application of full braking force will take up between 270–300 milliseconds.

Another very important advantage of my apparatus is seen to reside in its utter simplicity. The valve 13, 18, 2c of the servomotor is exceptionally simple and comprises a very small number of parts. Also, this simple valve allows for the utilization of a very simple piston (14) for the servomotor and for the provision of very simple channels which connect the chamber 200 with the chamber 100 or with the atmosphere. The piston element 5 constitutes a highly effective device for transmitting to the driver's foot the counterpressure of the fluid 6 and enables the apparatus to achieve any desired ratio between the braking pressure and such counterpressure.

It is clear that the improved apparatus is susceptible of many additional modifications without departing from the spirit of my invention. For example, this apparatus can be utilized in so-called two-cycle systems which are becoming increasingly popular in the automobile industry. In such systems, the cylinder of the servomotor accommodates two pistons.

Also, the apparatus of FIGS. 1–4 can be utilized with minimal modifications in a power steering system and/or in a clutch.

The feature that the extension 5a of the piston element 5 extends with clearance into a reduced-diameter portion of the outer piston element 3 is of advantage because the piston element 5 is properly guided at all times and also because it allows for convenient connection with a second hydraulic cycle. Such two-cycle or two-stage hydraulic braking systems are becoming increasingly popular in all types of road vehicles because they offer greater safety to the occupants.

Figure 5:
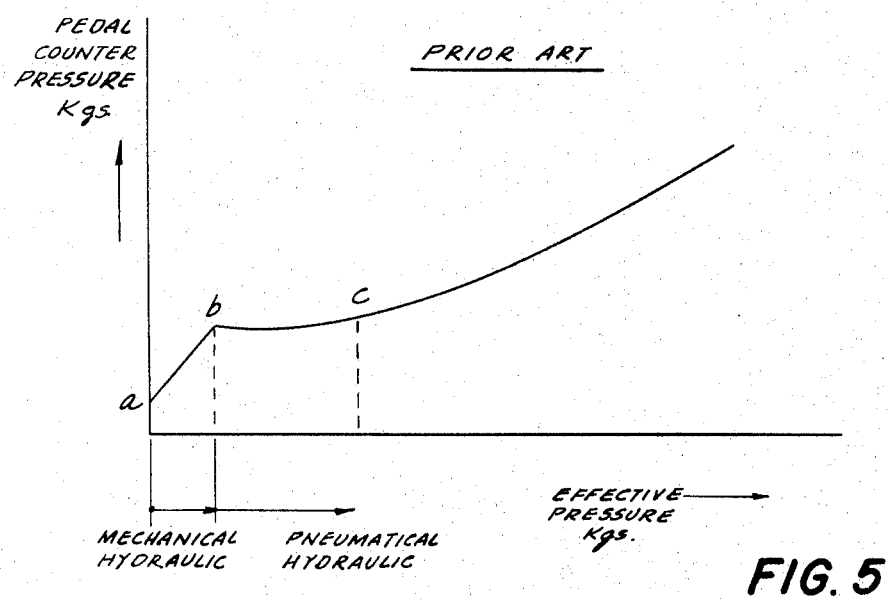
FIG. 5 is a diagram showing the relationship between the pedal counterpressure and effective braking pressure in a conventional pressurizing apparatus which is used in the brake system of an automobile.

The advantages of my apparatus will be more readily appreciated by referring to the diagrams of FIGS. 5 and and 6. FIG. 5 illustrates the rise in pedal counterpressure as a function of the effective pressure (both measured in kilograms) in a conventional braking system. At the start of a braking operation, the driver will overcome the pedal counterpressure at a. Such counterpressure depends on the bias of the springs which are utilized in a conventional apparatus. The braking action begins at a and rises linearly to the point b solely in response to a combined mechanical and hydraulic pressure. In other words, in the stage between the points a and b, the servomotor of the conventional apparatus is ineffective but its action begins at b without gradual transition and without further depression of the pedal. The effective braking pressure increases steeply (as seen along the abscissa of the diagram shown in FIG. 5) but, while such braking pressure rises from b to c, the driver has no sensation that the braking pressure has increased because the pedal counterpressure increases very litle, if at all. This is clearly shown in FIG. 5. In other words, while the braking pressure increases from b to c, the operator of the vehicle is not aware of such increasing pressure because his foot does not meet a greater resistance. The effective pressure at c corresponds to a hydraulic pressure of 20–25 atmospheres. From then on, the curve indicating the relationship between the pedal counterpressure and effective pressure resembles a parabola and the driver is again in a position to control the braking action.

Figure 6:
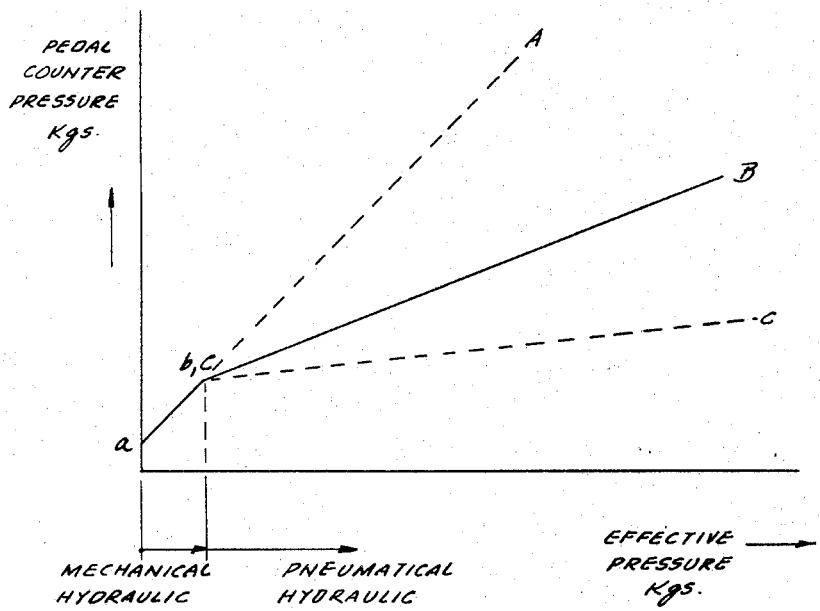
FIG. 6 is a similar diagram showing the relationship between the pedal counterpressure and effective braking pressure in the apparatus of FIGS. 1 to 4.

Referring now to FIG. 6, there is shown a diagram which illustrates the relationship between pedal counterpressure and effective pressure in the apparatus of my invention. At the start of the braking operation, the function of the improved apparatus is the same as described in connection with FIG. 5, i.e., the braking action begins when the pedal counterpressure rises to a and the braking action then proceeds linearly as indicated in FIG. 6 by a steep line connecting the points a and b. Between these points, the braking action is a combined mechanical and hydraulic action, i.e., it depends solely on the muscle power of the driver. The point b concides with the point c because the operator senses immediately a rise in pedal counterpressure as soon as the servomotor becomes effective. The pedal counterpressure then increases linearly as indicated by the lines A, B and C. Thus, the pedal counterpressure rises continuously until the pneumatically produced braking pressure attains a maximum value, i.e., until the atmospheric air entering the chamber 200 of the cylinder 7 ceases to bring about further displacement of the piston 14. The exact inclination of the line which indicates the ratio of pedal counterpressure to effective pressure will depend on the desired type of braking action, i.e., whether the designer wishes the brake to produce a so-called hard or sporty braking action or a relatively soft and smooth braking action. The line A indicates in FIG. 6 a so-called hard braking action which can be brought about by increasing the cross-sectional area of the extension 5a on the inner piston element 5 so that it equals the cross-sectional area of the piston element 3. This can be achieved by a stepwise enlargement of the upper end of the piston element 3. The just described hard braking action (line A) is preferred by a relatively small number of drivers. The drivers normally prefer a braking action which is represented by the line B and which can be achieved by utilizing the apparatus of FIGS. 1 to 4. If the diameter of the piston element 5 is reduced still further, the braking action will be such as indicated in FIG. 6 by the line C.

It is to be noted that, if the driver continues to depress the pedal after the servomotor has ceased to shift the master piston (piston element 3) into the master cylinder 4, the braking pressure will rise again in the same way as between the points b and c. Of course, such rise in effective pressure will take place only if the driver can supply the force which is necessary for further depression of the pedal P. Wth reference to FIG. 4, the depression of the pedal upon completion of the braking action caused by the servomotor will bring about additional braking action when the shoulder 2b of the piston element 2 will engage the washer 20 and will begin to displace the piston 14 and hence the piston element 3.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. Apparatus for pressurizing an entrapped body of fluid, comprising, in combination, a first cylinder containing a supply of fluid; a first piston reciprocable in said first cylinder to pressurize the fluid while moving in one direction from a retracted position; a second cylinder; a second piston received in said second cylinder and comprising a flexible diaphragm dividing the interior of said second cylinder into a pair of chambers, and means for moving said first piston in said one direction in response to its own movement in said one direction from a starting position while reducing the volume of one of said chambers; suction generating means communicating with said one chamber; valve means for connecting said chambers to each other and for sealing the other chamber from the atmosphere in said retracted position of said first piston, said valve means comprising a first valve seat formed by a portion of said diaphragm and a second valve seat on said second piston, a first valve member provided on said first piston and engaging said first valve seat in said retracted position of said first piston to thereby seal said other chamber from the atmosphere, and a second valve member constituted by an annular bead of said diaphragm concentric with and surrounding said first seat and engaging said second valve seat in response to movement of said first piston from said retracted position to thus seal said chambers from each other; and motion transmitting means for moving said first piston from said retracted position and for thus sealing said chambers from each other together with connecting said other chamber to the atmosphere so that the resulting differential between the pressures in said chambers effects movement of said second piston from said starting position and attendant additional movement of said first piston from said retracted position.

2. Apparatus as set forth in claim 1, further comprising resilient means for biasing said first valve seat against said first valve member in the retracted position of said first piston.

3. Apparatus for pressurizing an entrapped body of fluid comprising, in combination, a first cylinder containing a supply of fluid; a first piston reciprocable in said cylinder to pressurize the fluid while moving from a retracted position; a second cylinder; a second piston received and dividing the interior of said second cylinder into a pair of chambers and comprising means for moving the first piston from said retracted position in response to its own movement from a starting position to thus reduce the volume of one of said chambers; suction generating means connected with said one chamber; valve means for connecting said chambers to each other with concomitant sealing of the other chamber from the atmosphere in said retracted position of said first piston; and motion transmitting means for moving said first piston from said retracted position and for thus sealing said chambers from each other together with connecting said other chamber to the atmosphere so that the resulting differential between the pressures in said chambers effects movement of said second piston from said starting position and attendant additional movement of said first piston from said retracted position, said first piston comprising a tubular outer piston element, a first inner piston element reciprocably received in said outer piston element and having a portion dipping into the supply of fluid in said first cylinder, and a second inner piston element coupled with said motion transmitting means and arranged to displace said outer piston element through the intermediary of said first inner piston element in response to its own displacement by said motion transmitting means.

4. Apparatus as set forth in claim 3, wherein said portion of said first inner piston element is received with clearance in said outer piston element.

References Cited

UNITED STATES PATENTS

| | | |
|---|---|---|
| 2,331,238 | 10/1943 | Schnell. |
| 2,735,268 | 2/1956 | Stelzer. |
| 2,969,807 | 1/1961 | Whitten _____ 91—376 XR |
| 2,985,143 | 5/1961 | Stelzer. |
| 3,109,287 | 11/1963 | Gardner. |
| 3,150,493 | 9/1964 | Rike. |
| 3,172,334 | 3/1965 | Wuellner et al. |
| 3,237,525 | 3/1966 | Stelzer. |

MARTIN P. SCHWADRON, *Primary Examiner.*

ROBERT R. BUNEVICH, *Examiner.*